O. RICHTER.
FLUID PRESSURE TURBINE.
APPLICATION FILED FEB. 14, 1906.

909,226.

Patented Jan. 12, 1909.

3 SHEETS—SHEET 1.

WITNESSES:
W. H. Berrigan.
John H. Honing.

INVENTOR,
OSKAR RICHTER,
BY Van Oldenneel & Schoenbank
ATTORNEYS.

THE NORRIS PETERS CO., WASHINGTON, D. C.

O. RICHTER.
FLUID PRESSURE TURBINE.
APPLICATION FILED FEB. 14, 1906.

909,226.

Patented Jan. 12, 1909.

3 SHEETS—SHEET 2.

WITNESSES:

INVENTOR,
OSKAR RICHTER.
BY
ATTORNEYS.

O. RICHTER.
FLUID PRESSURE TURBINE.
APPLICATION FILED FEB. 14, 1906.

909,226.

Patented Jan. 12, 1909.
3 SHEETS—SHEET 3.

WITNESSES:
H. H. Berrigan
John H. Hoving

INVENTOR
OSKAR RICHTER,
BY Van Oldenmeester Schoonland
ATTORNEYS.

UNITED STATES PATENT OFFICE.

OSKAR RICHTER, OF MUNICH, GERMANY, ASSIGNOR TO MELMS & PFENNINGER, GESELL-SCHAFT MIT BESCHRÄNKTER HAFTUNG, OF MUNICH-HIRSCHAU, GERMANY.

FLUID-PRESSURE TURBINE.

No. 909,226.   Specification of Letters Patent.   Patented Jan. 12, 1909.

Application filed February 14, 1906. Serial No. 300,957.

*To all whom it may concern:*

Be it known that I, OSKAR RICHTER, a citizen of Switzerland, residing in Munich, Germany, (whose post-office address is 2 Bismarckstrasse, Munich,) have invented certain new and useful Improvements in or Relating to Fluid-Pressure Turbines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

I have applied for patent in Switzerland on April 20th 1905, Patent No. 33390; in Germany on May 29th 1905, application R. 21200; in Austria on July 28th 1905, application A. 4054–05; in Hungary on August 5th 1905; in Great Britain on January 11th 1906, application No. 767/06.

This invention relates to a combined action and reaction turbine for elastic fluids and has for its object to utilize the actuating medium better than was heretofore effected in the high pressure part of reaction turbines, in which as is known, the high pressure blades are very small and the loss in leakage very great, even when for this part of the turbine fairly high circumferential velocities are chosen. To avoid this drawback under the present invention the high pressure part is formed as a partially extended action turbine, the middle and low-pressure part as a reaction turbine. The blades of the action part are on a larger diameter than those of the reaction part. From the point where one part passes into the other the diameter of the reaction part increases towards the end.

Figure 1:
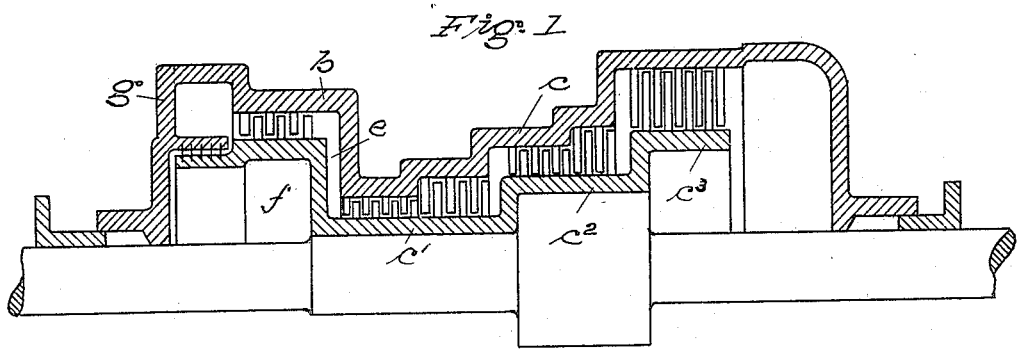
Figure 2:
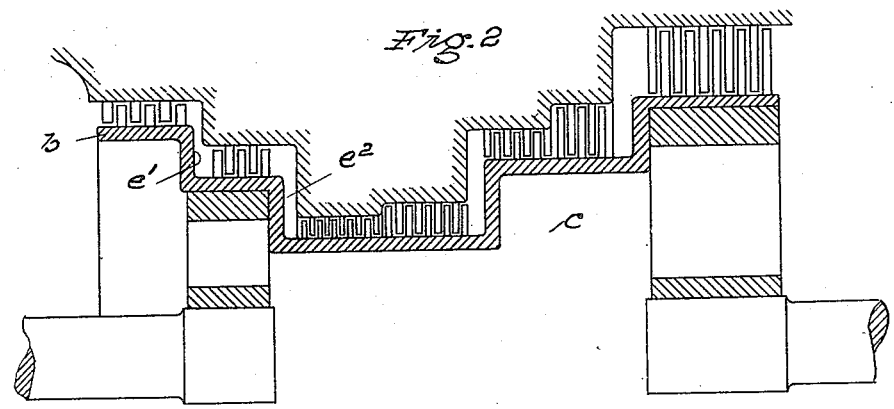
Figure 3:
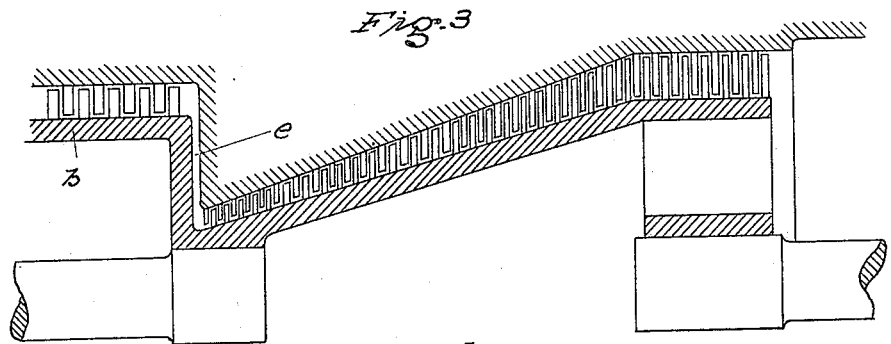
Figure 4:
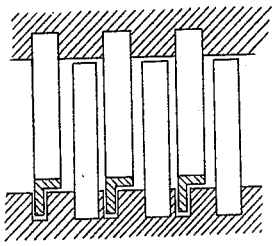
Figure 5:
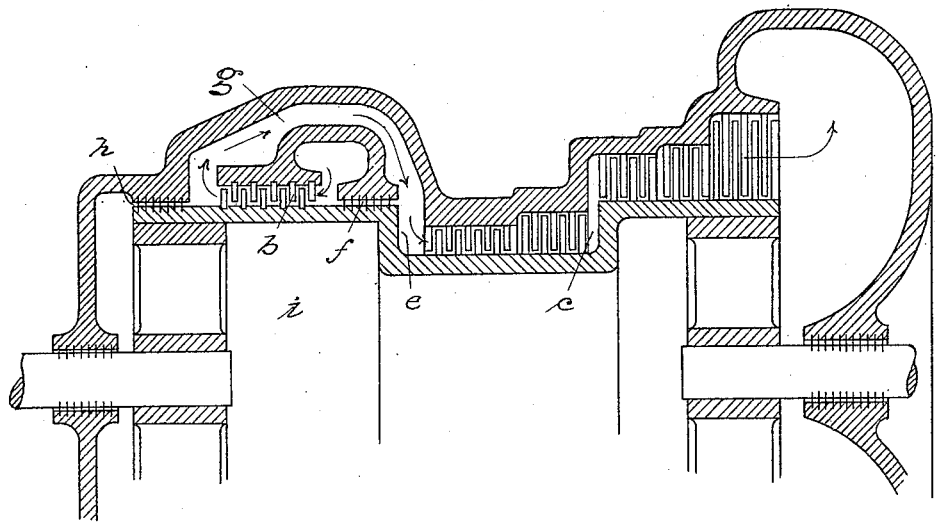
Figure 6:
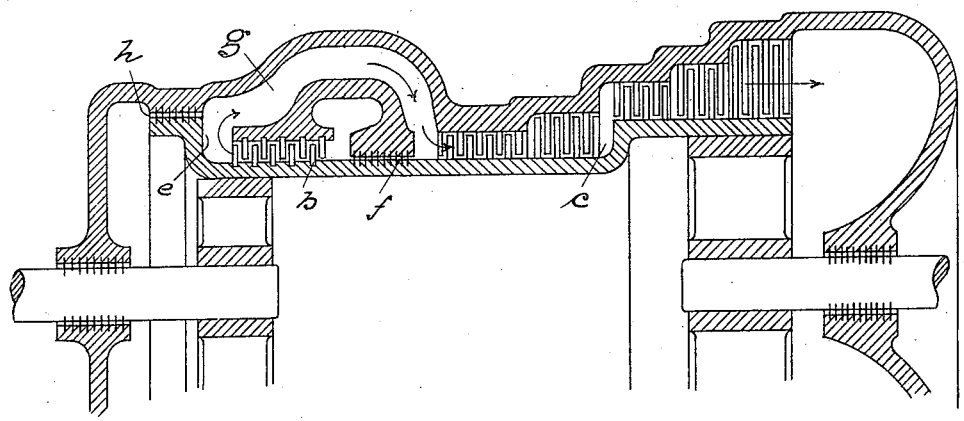
Figure 7:
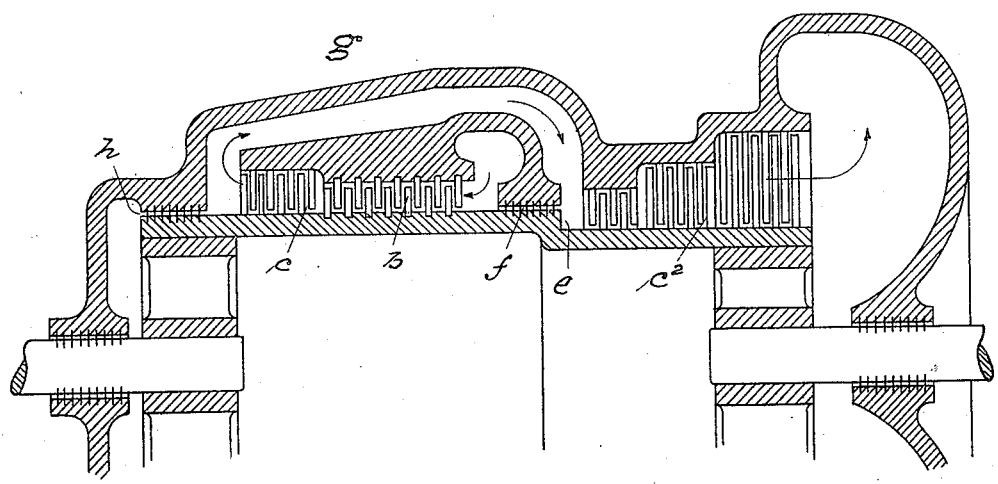
Figure 8:
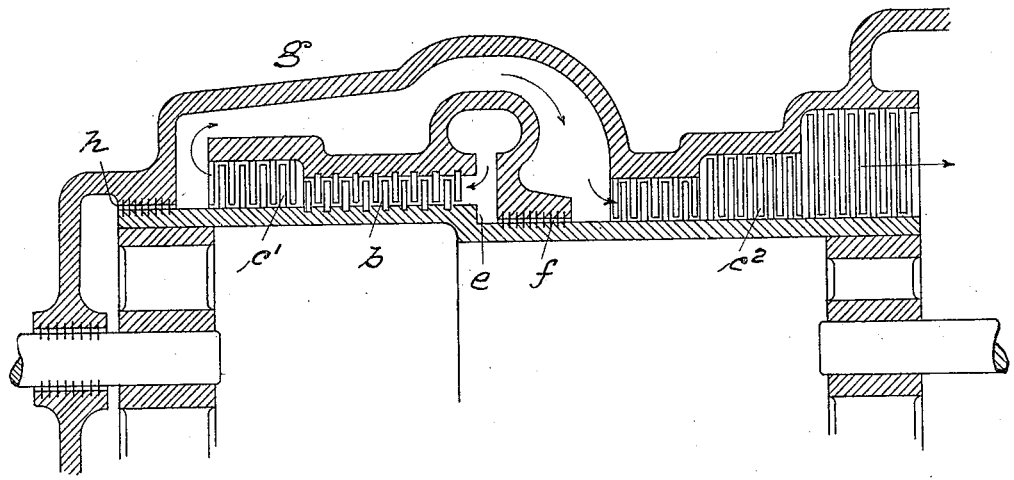

In Figures 1, 2 and 3 of the accompanying drawing are shown axial sections of three embodiments of the invention in the form of steam turbines. Fig. 4 shows a detail. Figs. 5 and 6 are axial sections, showing labyrinth packing so disposed as to cause the steam to pass first in one direction through the action part of the apparatus and then in the other direction through the reaction part of the apparatus. Figs. 7 and 8 are axial sections, showing means to cause the steam to pass first in one direction through the action part and some of the blades of the reaction part and then to pass through the remaining blades of the reaction part.

In Fig. 1 $a$ designates the coupling piece for the steam supply pipe, $b$ the action part, $c$ the reaction part of the turbine, and $d$ the coupling piece of the exhaust outlet. The step between the action and reaction part due to the difference in diameters forms an annular surface $e$ for completely relieving the reaction part. The reaction part is formed with three stages $c^1$, $c^2$, $c^3$ increasing in diameter, the front blades of the two first stages being smaller than the rear blades of the same. The stage $c^3$ carries the largest blades in view of the increased volume and diminished pressure of the steam. In order to relieve the end face of the rotary wheel $f$ the front side of the casing $g$ is connected by a pipe $h$ with the exhaust steam outlet connection $d$.

In the construction shown in Fig. 2 the action part $b$ is formed with two stages tapering towards the reaction part $c$. The annular surface serving to relieve the reaction part is composed of two parts $e^1$ and $e^2$. The reaction part is again formed with three stages. The balance of pressure between the front and rear part of the turbine can take place through the hollow rotary wheel.

According to Fig. 3 the action part is again formed with one stage and the reaction part made conical.

Fig. 4 shows a so-called labyrinth packing between the guide vanes and the blades of an action part which is employed for the purpose of keeping the expansion of the steam as much as possible only between the guide-vanes and to reduce to a minimum the leakage of steam or the passage of steam between the guide vanes and the rotary wheel body. Also the packing on the steam inlet side between fresh steam and vacuum can be effected by labyrinth packing. The governing of the turbine can be effected in any suitable way either by altering the impact of the action part or by throttling or otherwise. Instead of being step-shaped or cone-shaped the reaction part might also be curved.

With the constructions shown in Figs. 5 to 8 a better utilization of the steam and better applicability is obtained than with the construction above described, wherein at the fluid inlet only a labyrinth packing on one side is employed.

In the example shown in Fig. 5 $a$ is the inlet to which is connected on one side the action part $b$ on the other side a labyrinth packing $f$, so that the greatest part of the steam passes from the passage $a$ to the left through the action part $b$, then as shown by arrows the direction is altered and the steam passes through a passage $g$ to the reaction part $c$ and flows through the same in the opposite direction to the flow in the action part. The steam escaping through the labyrinth packing $f$ joins in front of the reaction part the other portion coming from the action part and is usefully employed. The steam escaping through the labyrinth packing $h$ on the opposite side of the action part is however lost. Between the packing $f$ and the reaction part the rotary wheel $i$ is formed as a step with an annular surface $e$ which serves to relieve the shaft bearing from the axial thrust produced in the reaction part.

The example shown in Fig. 6 differs from the foregoing mainly only in this that the annular surface $e$ lies between the action part and the packing $h$.

In the turbine shown in Fig. 7 the steam flows both through the action part $b$ and also in the same direction past the first group $c^1$ of reaction blades directly connected thereto, then alters its direction and passes through the passage $g$ to the second group $c^2$ of the reaction blades and flows past the same in the opposite direction to the first group. This arrangement requires a smaller relieving annular surface $e$ which is located between the packing $f$ and the group $c^2$.

In Fig. 8 the annular surface $e$ is directly connected to the steam inlet $a$ and lies between the packing $f$ and the action part. It is also relatively small as the steam passes through the first group $c^1$ of reaction blades in the same direction as the action part but in opposite direction through the second group $c^2$ of the reaction blades.

What I claim is:

1. In an elastic fluid turbine, the combination, with the casing and the shaft, of a drum higher at one part than at another part, blades for the high pressure on the higher part, blades for the lower pressure on the lower part, a packing on the drum, a fluid inlet between the high pressure blades and said packing and a shoulder between the higher and lower parts of the drum dimensioned proportionately to and opposed to any axial thrust on the shaft.

2. In an elastic fluid turbine, the combination, with a casing and a shaft, of a drum higher at one part than at another part, blades for the high pressure on the higher part, blades for the lower pressure on the lower part, means for causing the fluid to traverse both sets of blades and a shoulder between the higher and lower parts of the drum dimensioned proportionately to and opposed to any axial thrust on the shaft.

3. In an elastic fluid turbine, the combination with a casing and a shaft, of a drum higher at one part than at another part, blades for the high pressure on the higher part, blades for the lower pressure on the lower part, a fluid inlet on the higher part adjacent to the high pressure blades, a packing on the other side of the fluid inlet, the place of transition from the high pressure part to the lower pressure part offering to the driving medium a pressure surface, which is so measured and situated that the pressure acting upon it and generated by the driving medium flowing from the high pressure part into the lower pressure part, is equal to but directed opposite to the pressure which is generated in the lower pressure part in axial direction.

4. In an elastic fluid turbine, the combination with a casing and a shaft, of a drum higher at one part than at another part, blades on the higher and the lower part, on the higher part being located the action part and the lower part forming the reaction part, stationary guide blades on the action part within which the expansion of the fluid takes place and which guide vanes are arranged to form with the drum a labyrinth packing for the purpose of keeping the expansion of the fluid as much as possible only between the guide-vanes, a pressure surface between the action and reaction part for equalizing the pressure which is generated by the fluid in the reaction part in axial direction.

5. In an elastic fluid turbine, the combination with a casing and a shaft, of a drum higher at one part than at another part, the higher part containing the action part which is constructed as a partly-supplied pressure turbine and has its driving blades arranged on the drum, the guide-blades of the action part forming, with the drum, a labyrinth packing, a pressure surface between the action part and the lower or reaction part, this pressure surface being so measured and situated that the pressure acting upon it and generated by the fluid equalizes the pressure which is generated by the fluid in the reaction part in axial direction.

6. In an elastic fluid turbine, the combination with a casing and a shaft, of a drum higher at one part than at another part, blades for the high pressure on the higher part, blades for the lower pressure on the lower part, on the high pressure part being formed an action turbine with a plurality of rows, the supply of these rows increasing with each row from the fluid inlet towards the lower pressure or reaction part according to the increasing expansion of the fluid which takes place in the guide blades of the action part, a packing on the drum adjacent to the fluid inlet but opposite to the action blades, a pressure surface on the place of transition from the action to the reaction part dimensioned proportionately to and opposed to any axial thrust on the shaft.

7. In an elastic fluid turbine, the combination with the casing of a drum having one part thereof higher than another part, blades on said higher part, means for admitting motive fluid to the blades, a packing on the lower part of the drum adjacent to the fluid inlet, a shoulder between said packing and the aforesaid blades another set of blades located on the lower part of the drum and means for conducting the motive fluid from the first named blades to the second named blades.

8. In an elastic fluid turbine, the combination with the casing and the shaft of a drum higher at one part than at another part, blades for the high pressure on the higher part, blades for the lower pressure on the lower part, means for causing the fluid to traverse the latter in the opposite direction to the high pressure blades, means forming an obstacle to the flow of high pressure fluid between the two said sets of blades, and a shoulder between the higher and lower parts of the drum dimensioned proportionately to and opposed to any axial thrust on the shaft.

In testimony whereof, I have signed my name to this specification in the presence of two subscribing witnesses.

OSKAR RICHTER.

Witnesses:
ULYSSES J. BYWATER,
MATHILDE K. HELD.